(12) United States Patent
Barrass

(10) Patent No.: US 7,593,315 B2
(45) Date of Patent: Sep. 22, 2009

(54) CABLE DIAGNOSTICS FOR 10GBASE-T TRANSCEIVERS

(75) Inventor: Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 10/775,529

(22) Filed: Feb. 9, 2004

(65) Prior Publication Data

US 2005/0174926 A1    Aug. 11, 2005

(51) Int. Cl.
    *H04J 1/12*    (2006.01)
(52) U.S. Cl. .................. 370/201; 370/241; 375/227
(58) Field of Classification Search .............. 370/201; 375/220, 224, 227, 233, 234, 254, 346, 348
    See application file for complete search history.

(56) References Cited

U.S. PATENT DOCUMENTS

| | | | | |
|---|---|---|---|---|
| 4,858,224 | A  * | 8/1989 | Nakano et al. | 370/217 |
| 6,236,645 | B1 * | 5/2001 | Agazzi | 370/286 |
| 6,512,746 | B1 * | 1/2003 | Sand | 370/252 |
| 2001/0026150 | A1 * | 10/2001 | Klenner | 324/76.26 |
| 2003/0007581 | A1 | 1/2003 | Agazzi et al. | |
| 2003/0194001 | A1 * | 10/2003 | Barksdale, Jr. | 375/229 |
| 2004/0095921 | A1 * | 5/2004 | Kerpez | 370/351 |
| 2004/0184518 | A1 * | 9/2004 | Agazzi | 375/220 |
| 2004/0184620 | A1 * | 9/2004 | Johnson et al. | 381/101 |
| 2004/0251913 | A1 * | 12/2004 | Pharn et al. | 324/534 |
| 2005/0063479 | A1 * | 3/2005 | Propp et al. | 375/260 |
| 2008/0013110 | A1 * | 1/2008 | Wozniak et al. | 358/1.2 |

OTHER PUBLICATIONS

Kavehrad et al., "10Gbps Transmission over Standard Category-5 Copper Cable" Globecom 2003; pp. 4106-4110; 0-7803-7974-8/03/ $17.00© 2003 IEEE.
William Jones, "10GBASE-T Tutorial Overview" Solaflare Communications; pp. 1-34; XP-002340260.

* cited by examiner

*Primary Examiner*—Ricky Ngo
*Assistant Examiner*—Kan Yuen
(74) *Attorney, Agent, or Firm*—BainwoodHuang LLC

(57) ABSTRACT

A 10GBASE-T transceiver that is capable of performing cable diagnostics. The transceiver is a physical layer device (PHY) that has four transceiver sections. Each section includes an input path and an output path. The input path generally includes a receiver, an analog-to-digital converter, a far end cross talk/near end cross talk canceller section, an alien noise canceller section, and an equalizer section. The output path includes a coding and preconditioning section, a digital-to-analog converter, and a transmitter. A substantial savings can be realized by utilizing the same elements that perform data communication to perform cable diagnostics. The diagnostics might occur before a link is formed or after a link is formed and may be based on test signals only or on data signals or communications. A first PHY might perform diagnostics alone or in combination with a second PHY which is in communication with the first as a link partner.

38 Claims, 1 Drawing Sheet

CABLE DIAGNOSTICS FOR 10GBASE-T TRANSCEIVERS

FIELD OF THE INVENTION

The present invention relates generally to data communication systems. More specifically, the present invention relates to 10GBASE-T transceivers that are capable of performing cable diagnostics.

BACKGROUND OF THE INVENTION

The Institute of Electrical and Electronics Engineers (IEEE) has developed a comprehensive International Standard for Local Area Networks (LANs) employing Carrier Sense Multiple Access with Collision Detection (CSMA/CD) as the access method. The IEEE standard is intended to encompass several media types and techniques for signal rates from one megabit per second (1 Mb/s) to ten thousand megabits or ten gigabits per second (10,000 Mb/s or 10 Gb/s). The IEEE standard introduces an Open Systems Interconnection (OSI) reference model that includes a number of layers. The layer that is of interest in this discussion is the physical layer which is located between the transmission medium and the data link layer. For 1000 Mb/s, for example, between the medium and the data link layer there is defined a medium dependent interface (MDI), a physical layer device (PHY), an optional gigabit media independent interface (GMII), and a reconciliation sublayer. The physical layer device is defined as including a physical medium dependent (PMD), a physical medium attachment (PMA), and a physical coding sublayer (PCS). The physical layer device is covered by the Access Method and Physical Layer Specification IEEE Std 802.3.

Although not covered by the current IEEE standard, the next order of magnitude improvement for twisted pair cable would be to advance to ten gigabits per second (10 Gb/s) in a communications protocol such as 10GBASE-T Ethernet. This however raises a whole new set of questions as the technology is pushing the transmission medium to its physical limits. Implementation issues that have not arisen before or at least not to such a degree will likely have to be addressed. An integral part of successful communications is a quality transmission medium. In terms of the protocol, the best available cable will likely be chosen when the choice is to be made. Practically speaking however, that cable might not always be used in the field. In the case of 10GBASE-T which is not set at this time, the preferred cable is likely to be Category 7 (CAT-7) double shielded twisted pair conductors. The specified length is likely to be one hundred meters. However, some forms of lesser cables such as CAT-6 and even CAT-5 might be actually used or even specified over shorter distances. Given the new implementation issues, it would therefore be beneficial for the physical layer device to be capable of performing cable diagnostics on the transmission medium.

BRIEF DESCRIPTION OF THE INVENTION

A 10GBASE-T transceiver that is capable of performing cable diagnostics is disclosed. The transceiver is a physical layer device (PHY) that has four transceiver sections. Each section includes an input path and an output path. The input path generally includes a receiver, an analog-to-digital converter, a far end cross talk/near end cross talk canceller section, an alien noise canceller section, and an equalizer section. The output path includes a coding and preconditioning section, a digital-to-analog converter, and a transmitter. A substantial savings can be realized by utilizing the same elements that perform the data communication to perform the cable diagnostics. The diagnostics might occur before a link is formed or after a link is formed and may be based on test signals only or on data signals or communications. A first PHY might perform diagnostics alone or in combination with a second PHY which is in communication with the first PHY as a link partner.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Figure 1:
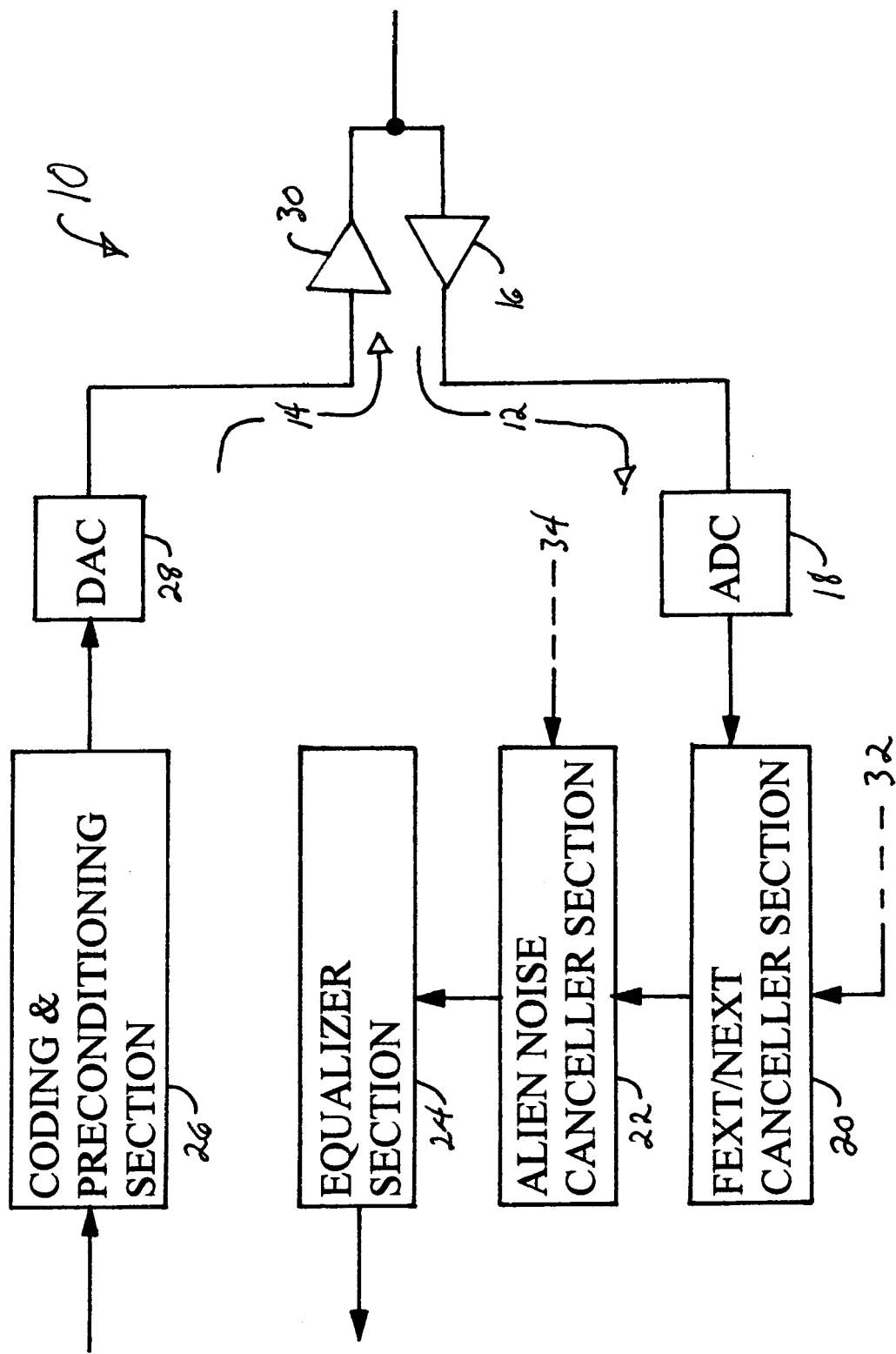
FIG. 1 is a schematic block diagram of a physical layer device (PHY) according to the present invention.

Various exemplary embodiments of the present invention are described herein in the context of 10GBASE-T transceivers that are capable of performing cable diagnostics. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In addition, one of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described herein.

Turning first to FIG. 1, a schematic block diagram of a physical layer device (PHY) 10 according to the present invention is shown. The PHY 10 is capable of communicating at 10 Gb/s and performing cable diagnostics using the same elements. The diagram has been simplified by showing only one of the four transceiver sections that would be required for one of the transmission lines that serves to form a link. The other three transceiver sections are similar to that shown except as noted below. The PHY 10 has an input path 12 and an output path 14. The input path 12 includes a receiver 16, an analog-to-digital converter (ADC) 18, a far end cross talk (FEXT)/near end cross talk (NEXT) canceller section 20, an alien noise canceller section 22, and an equalizer section 24. The output path 14 includes a coding and preconditioning section 26, a digital-to-analog converter (DAC) 28, and a transmitter 30. Other elements that are not shown might also be included. The order of the elements may not be strictly as shown. Various of the shown elements might be combined or divided. The various elements shown may take the form of hardware, firmware, software, or some combination of the three. The FEXT/NEXT canceller section 20 is shown to have a second input 32 which comes from one of the other transceiver sections that are not shown. While there are four transceiver sections in the PHY 10, there will be six total FEXT/NEXT sections 20 with one for every possible combinations of two, that is, assuming that the four lines are numbered one to four, then combinations one and two, one and three, one and four, two and three, two and four, and three and four. The alien noise canceller section 22 is also shown to have a second input 34 which comes from each of the other transceiver sections that are not shown. While there are four transceiver sections in the PHY 10, there will only be one alien noise canceller section 22 with inputs from all four transceiver sections. So in total for the PHY 10 shown there will be four each of the receiver 16, the ADC 18, the equalizer section 24, the coding and preconditioning section 26, the DAC 28, and the transmitter 30. In addition there will be six FEXT/NEXT sections 20 and one alien noise canceller section 22.

As part of communicating at 10 Gb/s, the input path 12 of the PHY 10 should have sufficient resolution to resolve the multi-level communication symbols in a signal that may or may not be attenuated. The dynamic range should accommodate very short links with almost no attenuation as well as maximum length links with maximum attenuation. This may be achieved by using Automatic Gain Control (AGC). The AGC will simply detect the total received power and increase the gain of the receiver 16 so that the ADC 18 operates over its maximum range. The gain function should be related to the gross attenuation of the link and may be obtained by an explicit training process or as a result of a blind training process.

The FEXT/NEXT canceller section 20 generally operates to cancel unwanted noise across pairs of lines. Either the transmitted signal for NEXT or the received signal for FEXT from an adjacent line is subtracted from the input for a given line according to an estimate of the coupling between the lines. This estimate of coupling in the form of coupling parameters may be obtained by an explicit training process or as a result of a blind training process. Although possible, the latter is complex enough that it may not be justifiable in all instances. The NEXT coupling should be largely independent of the link length and should be dominated by the type of cable and connectors used in the first ten meters or so of the link.

The alien noise canceller section 22 generally operates to mitigate unwanted noise across all of the lines substantially simultaneously. The mitigation may take the form of noise whitening which will reduce the effect of narrow band and correlated noise on the incoming signals. Alternatively, a correlation function may be used to detect and extract common mode noise from the four links. In either case, the alien noise mitigation function operates without static parameters and requires no training as with other elements.

The equalizer section 24 operates on each link separately. The equalization function may be established by an explicit training process or as a result of a blind training process with the latter being more likely. The equalizer section 24 may use a decision feedback mechanism which uses the mean square error function of the symbol decoder to adjust parameters in the equalizer function. The resultant set of equalizer parameters will describe a gain versus frequency function.

The receiver 16, the ADC 18, the coding and preconditioning section 26, the DAC 28, and the transmitter 30 may be of substantially conventional design for performing substantially conventional functions. One or more of these elements may have to be modified from their conventional design in order to perform cable diagnostics in addition to standard data communications as described below.

In terms of performing cable diagnostics, the three most pertinent characteristics that define the link are signal attenuation, FEXT/NEXT coupling, and alien noise levels. Other characteristics might also be considered pertinent and can be addressed likewise if desired or required. The above three characteristics can be expressed as a function of frequency. There is some interplay between the characteristics, so a single standard for each individually is not entirely suitable but likely will be adopted for simplicity. A link may still be possible with various combinations of characteristics. For example, a link with a higher than standard attenuation at high frequencies may still support 10 Gb/s operation if the noise floor is lower than standard. Further, although most standards describe links in terms of length, the reality is that length is rarely a critical parameter in its own right. Nevertheless, link length is a factor in calculations for signal attenuation and FEXT coupling so measuring link length would be possible and may be desirable. Further, measuring both gross attenuation and attenuation with frequency over the range of the transmit spectrum would be possible and may also be desirable. As noted above, given the new implementation issues, it would be beneficial for the PHY to be capable of performing cable diagnostics to determine one or more of the characteristics of the link. A substantial savings can be realized by utilizing the same elements that perform the data communication to perform the cable diagnostics. The diagnostics might be timed to occur before a link is formed or after a link is formed and may be based on test only signals or communications or on data signals or communications. A first PHY might perform diagnostics alone or in combination with a second PHY which is in communication with the first PHY as a link partner. There are a number of options including combinations of options.

Without a link partner, the PHY 10 can perform cable diagnostics by listening to its own transmissions, to background noise, or both. To measure attenuation of a single link, a Time Domain Reflectometry (TDR) or similar function can be performed. The TDR function will be able to measure the length of the link if the cable is not terminated or if the termination allows some discernable reflections. The accuracy of the length measurement will depend on the velocity of propagation for the cable type which must be known. Additionally, the TDR function can be designed such that it is able to measure the gross attenuation for an open or shorted link. For example, it would be possible to measure the attenuation with frequency by sending constant tone signals over the link and listening for the reflected signal above the echo of the transmitted signal. For normal data communication, the PHY 10 can be designed to be capable of the echo cancellation required for the TDR function of this diagnostic. This is so because, for normal communications, the sensitivity of the receiver 16 should be such that it is capable of detecting signals which have been attenuated over the maximum length of the link, for example, one hundred meters. Hence the receiver 16 can be made sensitive enough to detect signals which have been reflected by the far end of a shorter length such as fifty meters or which are at a lower frequency so that the attenuation is sufficiently less than for the maximum frequency. Under these assumptions, then the receiver 16 can have the capability to characterize the attenuation versus frequency across almost the entire range required for normal operation. The remaining attenuation characteristics can be extrapolated from the observed data. In order to perform attenuation versus frequency diagnostics, either the transmitter 30 is able to produce narrow band variable frequency signals, the receiver 16 is able to characterize the Power Spectral Density of the received signal, or both. The latter may be achieved in part by employing the equalizer section 24 in combination with the receiver 16.

To measure NEXT coupling without a link partner, the receiver 16 may again be employed by having the transmitter 30 transmit a signal on one link and having the receiver 16 characterize the received signal on one or more of the other three links. This is so because, for normal communications, the sensitivity of the receiver 16 should be such that it is capable of detecting signals which have been attenuated over the maximum length of the link, for example, one hundred meters. Hence the receiver 16 can be made sensitive enough to detect signals which are coupled from adjacent transmitters as the NEXT coupling attenuation is generally lower than the maximum length link attenuation for some or all of the frequency range. This measurement may be done prior to operation or during normal communications where the NEXT echo may be mitigated through feedback. This test may be run several times with different links as the transmission link.

In place of or in addition to the receiver 16, the equalizer section 24 can be employed without a link partner to perform cable diagnostics. The equalizer section 24 operates while communicating by defining some form of filter function with variable coefficients. The received signal is modified by the filter function and the received symbol is decoded. Based on the difference between the expected symbol and the received symbol, the filter coefficients can be adjusted. This adjustment mechanism is often complex and may utilize proprietary methods but is well within the ability of one of ordinary skill in the art. As long as a stream of valid characters is available, then the filter coefficients should be able to converge. The degree and speed of convergence may depend on the circumstances. The convergence will produce a set of filter coefficients that represents a characterization of the received signal. For single link testing, a stream of characters is transmitted by the transmitter 28, travels down the length of the link, reflects off of the far end of the link, returns back down the length of the link, and is received by the receiver 16. Any echo is then removed resulting in a return signal that is run through the equalizer section 24 so that the stream of characters may be decoded. The resulting filter coefficients will provide an indication of the attenuation versus frequency characteristics of the link.

A similar test method may be used for NEXT coupling diagnostics. In this case, a continuous stream of characters are transmitted over one link and received on one or more of the other links. As the characters are decoded, the filter coefficients of the equalizer section 24 will provide an indication of the NEXT coupling characteristics of the links. This test may also be run several times with different links as the transmission link.

With a link partner, the PHY 10 will be able to perform even further cable diagnostics. Given that the transmission signal properties will be fixed by the emerging standard, then the profile of the signal that is received by the receiver 16 will reflect the attenuation characteristics of the link. Further, over time the coupling parameters in the FEXT/NEXT section will converge providing a reflection of the corresponding characteristics for the link. As above, the degree and speed of convergence may depend on the circumstances. Although the FEXT and NEXT parameters are generally related to each other, the relation is not always the same. If not, then two sets of parameters with one for FEXT and one for NEXT is preferred to a single set of parameters for both.

While the above two examples are based on normal operation of the link, important information can also be collected from operation at the margins involving what is known as out-of-envelope behavior. For any actual embodiment of the PHY 10, the designer can choose or determine the limits of all of the filter coefficients that are involved in maintaining a normal link. Nevertheless, communications may be established for a link having characteristics outside of one or more of the ranges. Likewise, over time the link characteristics may change to exceed one or more of the ranges. In either of these cases, it would be beneficial for the network administrator to be notified that a link is marginal, is becoming marginal, or both. It may also be beneficial to record the change in the link characteristics as an accelerating change may be predictive of a future failure which might in turn be avoided or at least the consequences of a failure might be minimized.

The alien noise level characteristic that defines a link is by its nature different from the signal attenuation and FEXT/NEXT coupling characteristics. The latter two characteristics are static while the alien noise level may be dynamic as it is injected into the link by unknown and uncontrolled outside influences. As a result, the tests for alien noise naturally employ various averaging techniques and record peak as well as average noise levels. The limits of the magnitude range of alien noise that can be tested will depend on the circumstances. As above, testing may be performed with and without a link partner. Without a link partner, the alien noise level test is similar to that above for NEXT coupling. A stream of characters are transmitted over one link and received on one or more of the other links. In this case however, the transmission level is reduced until the receiver 16 starts to detect errors. Given that the receive signal characteristics are known from the NEXT coupling test above, then the receive Signal-to-Noise Ratio (SNR) will indicate the alien noise level. Generally, the SNR readings may be deceptive, consequently the receive level should be lowered until a reliably measurable error rate occurs. For example on a maximum length link, when the Bit Error Ratio (BER) is greater than one in ten million, then it can be assumed that the alien noise level is at least equal to six decibels (6 dB) higher than that required for a compliant link. In other words, generally speaking if the received BER is less than one in ten million and the received signal level is at least 6 dB lower than the expected worst case receive level for the link, then the alien noise level should be acceptable. Similarly with a link partner, the partner can transmit at a level that is reduced by 6 dB. As the FEXT/NEXT coupling will scale accordingly, then their cancellation techniques remain unchanged. Again, for example, if the BER is less than one in ten million, then the alien noise level can be considered to be acceptable. Because alien noise may be dynamic, it may be desirable to monitor it continuously for links that are operational. One way in which to achieve this would be to reduce the transmit power level during inter packet gaps and other quiet periods and measure alien noise at these times.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A physical layer device (PHY) that is capable of communicating at least about ten gigabits per second (10 Gb/s) and performing cable diagnostics on at least one of a plurality of transmission lines that form one of a corresponding plurality of links that is coupled to the PHY, the PHY comprising:

a transceiver section for each of the plurality of transmission lines, the transceiver section has an input path and an output path and the transceiver section is capable of communicating and diagnosing at least one of the plurality of transmission lines, the transceiver section for each of the plurality of transmission lines is configured to pass communications at a rate of at least ten gigabits per second (10 Gb/s), the input path comprising a receiver having an input coupled to the corresponding link, an analog-to-digital converter (ADC) having an input coupled to an output of the receiver, at least one far end cross talk (FEXT)/near end cross talk (NEXT) canceller section, an alien noise canceller section, and an equalizer section and the output path comprising a coding and preconditioning section, a digital-to-analog converter (DAC) having an input coupled to an output of the coding and preconditioning section, and a transmitter having an input coupled to an output of the DAC and having an output coupled to the corresponding link;

wherein the transceiver section, when diagnosing at least one of the plurality of transmission lines, is configured to:

detect a signal attenuation characteristic of the at least one of the plurality of transmission lines, a FEXT/NEXT coupling characteristic of the at least one of the plurality of transmission lines, and an alien noise level characteristic of the at least one of the plurality of transmission lines; and detect operability of a link to pass communications at a rate of at least 10 Gb/s, the link corresponding to the at least one of the plurality of transmission lines, based upon a combination of the signal attenuation characteristic, FEXT/NEXT coupling characteristic, and the alien noise level characteristic of the at least one of the plurality of transmission lines, wherein the alien noise level characteristic relates to a dynamic noise received by the link from an outside source, and wherein each of the signal attenuation characteristic, FEXT/NEXT coupling characteristic, and the alien noise level characteristic is expressed as a function of frequency.

2. The PHY as defined in claim 1, wherein the cable comprises four transmission lines and the PHY comprises four transceiver sections with one transceiver section for each link.

3. The PHY as defined in claim 2, wherein, taken together, the four transceiver sections comprise four receivers, four ADCs, six FEXT/NEXT canceller sections, one alien noise canceller section, four equalizer sections, four coding and preconditioning sections, four DACs, and four transmitters.

4. The PHY as defined in claim 1, wherein the PHY performs cable diagnostics without a link partner.

5. The PHY as defined in claim 4, wherein the PHY performs cable diagnostics to characterize a length for at least one of the plurality of links.

6. The PHY as defined in claim 4, wherein the PHY performs cable diagnostics to characterize at least one of the plurality of links by utilizing Time Domain Reflectometry.

7. The PHY as defined in claim 4, wherein the PHY performs cable diagnostics to characterize at least one of the plurality of links by utilizing continuous test tones.

8. The PHY as defined in claim 4, wherein the PHY performs cable diagnostics to characterize at least one of the plurality of links by utilizing filter coefficients of the equalizer section.

9. The PHY as defined in claim 4, wherein the PHY performs cable diagnostics to characterize at least one of the plurality of links by lowering a transmit level of the PHY and monitoring a Bit Error Ratio to determine an alien noise level.

10. The PHY as defined in claim 1, wherein the PHY performs cable diagnostics with at least a second PHY as a link partner.

11. The PHY as defined in claim 10, wherein the PHY performs cable diagnostics to characterize at least one of the plurality of links by examining a profile of a signal that is received by the receiver of the PHY.

12. The PHY as defined in claim 10, wherein the PHY performs cable diagnostics to characterize at least one of the plurality of links by utilizing filter coefficients of the at least one FEXT/NEXT canceller section of the PHY.

13. The PHY as defined in claim 10, wherein the PHY monitors a change in one or more of the characteristics in at least one of the plurality of links to forecast a potential or diagnose an actual failure of at least one of the plurality of links.

14. The PHY as defined in claim 10, wherein the PHY performs cable diagnostics to characterize at least one of the plurality of links by receiving a lowered transmit level from the second PHY and monitoring a Bit Error Ratio to determine an alien noise level.

15. A method of performing cable diagnostics in a communications system that is capable of communicating at least about ten gigabits per second (10 Gb/s), the system comprises a physical layer device (PHY) and four transmission lines that each form a corresponding link for a total of four links, each of the transmission lines is coupled to the PHY, the PHY comprises a transceiver section for each of the transmission lines for a total of four transceiver sections, the four transceiver sections combined comprise four receivers, four analog-to-digital converters (ADC), six far end cross talk (FEXT)/near end cross talk (NEXT) canceller sections, an alien noise canceller section, four equalizer sections, four coding and preconditioning sections, four digital-to-analog converters (DAC), and four transmitters, the method comprising:

performing cable diagnostics by utilizing the PHY to characterize at least one of the four links;

wherein performing cable diagnostics by utilizing the PHY to characterize at least one of the four links comprises:

detecting a signal attenuation characteristic of the at least one of the plurality of transmission lines, a FEXT/NEXT coupling characteristic of the at least one of the plurality of transmission lines, and an alien noise level characteristic of the at least one of the plurality of transmission lines, wherein the alien noise level characteristic relates to a dynamic noise received by the link from an outside source, and wherein each of the signal attenuation characteristic, FEXT/NEXT coupling characteristic, and the alien noise level characteristic is expressed as a function of frequency; and detecting operability of a link to pass communications at a rate of at least 10 Gb/s, the link corresponding to the at least one of the plurality of transmission lines, based upon a combination of the signal attenuation characteristic, FEXT/NEXT coupling characteristic, and the alien noise level characteristic of the at least one of the plurality of transmission lines.

16. The method as defined in claim 15, wherein the PHY operates without a link partner.

17. The method as defined in claim 16, wherein performing cable diagnostics includes characterizing a length for at least one of the four links.

18. The method as defined in claim 16, wherein performing cable diagnostics includes characterizing at least one of the four links by utilizing Time Domain Reflectometry.

19. The method as defined in claim 16, wherein performing cable diagnostics includes characterizing at least one of the four links by utilizing continuous test tones.

20. The method as defined in claim 16, wherein performing cable diagnostics includes characterizing at least one of the four links by utilizing filter coefficients of at least one of the four equalizer sections.

21. The method as defined in claim 16, wherein performing cable diagnostics includes characterizing at least one of the four links by lowering a transmit level of the PHY and monitoring a Bit Error Ratio to determine an alien noise level.

22. The method as defined in claim 15, wherein the PHY performs cable diagnostics with at least a second PHY as a link partner.

23. The method as defined in claim 22, wherein performing cable diagnostics includes characterizing at least one of the four links by examining a profile of a signal that is received by at least one of the four receivers of the PHY.

24. The method as defined in claim 22, wherein performing cable diagnostics includes characterizing at least one of the four links by utilizing filter coefficients of at least one of the six FEXT/NEXT canceller sections of the PHY.

25. The method as defined in claim 22, wherein the PHY monitors a change in one or more of the characteristics in at least one of the four links to forecast a potential or diagnose an actual failure of at least one of the four links.

26. The method as defined in claim 22, wherein the PHY performs cable diagnostics to characterize at least one of the four links by receiving a lowered transmit level from the second PHY and monitoring a Bit Error Ratio to determine an alien noise level.

27. An apparatus for performing cable diagnostics in a communications system that is capable of communicating at least about ten gigabits per second (10 Gb/s), the system comprises a physical layer device (PHY) and four transmission lines that each form a corresponding link for a total of four links, each of the transmission lines is coupled to the PHY, the PHY comprises a transceiver section for each of the transmission lines for a total of four transceiver sections, the four transceiver sections combined comprise four receivers, four analog-to-digital converters (ADC), six far end cross talk (FEXT)/near end cross talk (NEXT) canceller sections, an alien noise canceller section, four equalizer sections, four coding and preconditioning sections, four digital-to-analog converters (DAC), and four transmitters, the apparatus comprising:

means for performing cable diagnostics by utilizing the PHY to characterize at least one of the four links;

wherein means for performing cable diagnostics by utilizing the PHY to characterize at least one of the four links comprises:

means for detecting a signal attenuation characteristic of the at least one of the plurality of transmission lines, means for detecting a FEXT/NEXT coupling characteristic of the at least one of the plurality of transmission lines, and means for detecting an alien noise level characteristic of the at least one of the plurality of transmission lines, wherein the alien noise level characteristic relates to a dynamic noise received by the link from an outside source, and wherein each of the signal attenuation characteristic, FEXT/NEXT coupling characteristic, and the alien noise level characteristic is expressed as a function of frequency; and means for detecting operability of a link to pass communications at a rate of at least 10 Gb/s, the link corresponding to the at least one of the plurality of transmission lines, based upon a combination of the signal attenuation characteristic, FEXT/NEXT coupling characteristic, and the alien noise level characteristic of the at least one of the plurality of transmission lines.

28. The apparatus as defined in claim 27, wherein the PHY operates without a link partner.

29. The apparatus as defined in claim 28, wherein the means for performing cable diagnostics includes characterizing a length for at least one of the four links.

30. The apparatus as defined in claim 28, wherein the means for performing cable diagnostics includes characterizing at least one of the four links by utilizing Time Domain Reflectometry.

31. The apparatus as defined in claim 28, wherein the means for performing cable diagnostics includes characterizing at least one of the four links by utilizing continuous test tones.

32. The apparatus as defined in claim 28, wherein the means for performing cable diagnostics includes characterizing at least one of the four links by utilizing filter coefficients of at least one of the four equalizer sections.

33. The apparatus as defined in claim 28, wherein the means for performing cable diagnostics includes characterizing at least one of the four links by lowering a transmit level of the PHY and monitoring a Bit Error Ratio to determine an alien noise level.

34. The apparatus as defined in claim 27, wherein the PHY performs cable diagnostics with at least a second PHY as a link partner.

35. The apparatus as defined in claim 34, wherein the means for performing cable diagnostics includes characterizing at least one of the four links by examining a profile of a signal that is received by at least one of the four receivers of the PHY.

36. The apparatus as defined in claim 34, wherein the means for performing cable diagnostics includes characterizing at least one of the four links by utilizing filter coefficients of at least one of the six FEXT/NEXT canceller sections of the PHY.

37. The apparatus as defined in claim 34, wherein the PHY monitors a change in one or more of the characteristics in at least one of the four links to forecast a potential or diagnose an actual failure of at least one of the four links.

38. The apparatus as defined in claim 34, wherein the PHY performs cable diagnostics to characterize at least one of the four links by receiving a lowered transmit level from the second PHY and monitoring a Bit Error Ratio to determine an alien noise level.

* * * * *